Feb. 23, 1954   R. E. HOWER ET AL   2,669,761
CABLE CONNECTOR
Filed Dec. 29, 1950   2 Sheets-Sheet 1
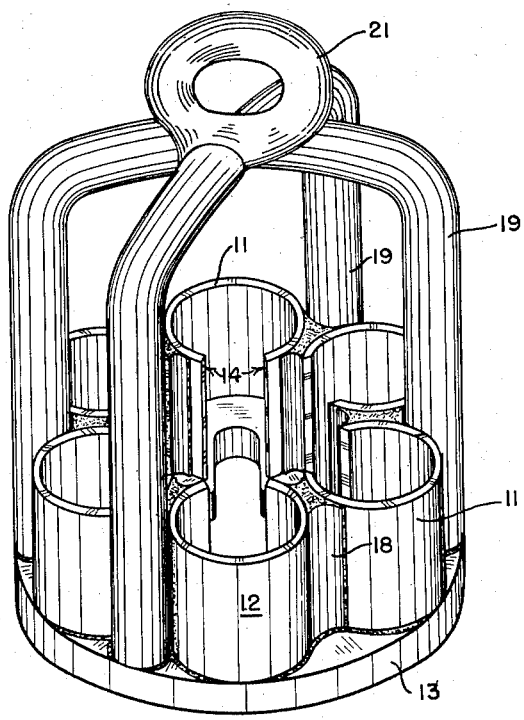
FIG.—1
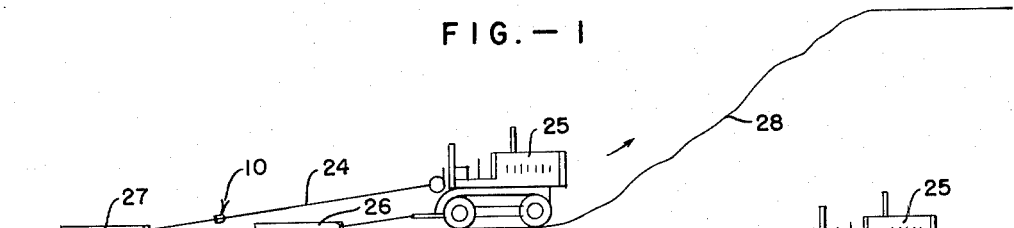
FIG.—4
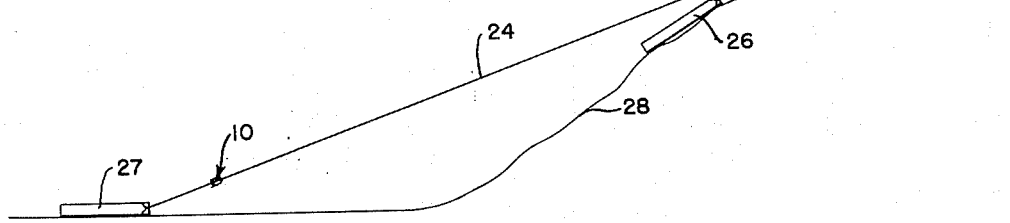
FIG.—5
INVENTOR.
Russell E. Hower &
BY   Al   Kuntz
ATTORNEY Feb. 23, 1954    R. E. HOWER ET AL    2,669,761
CABLE CONNECTOR
Filed Dec. 29, 1950    2 Sheets-Sheet 2
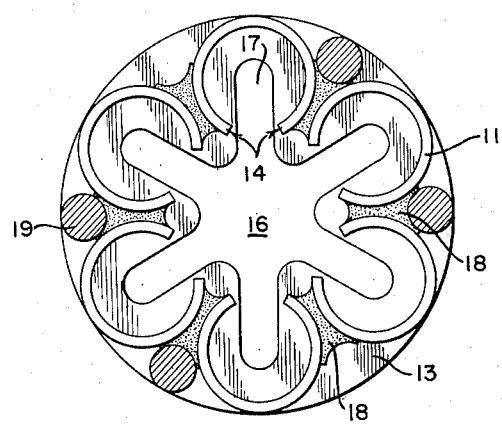
FIG.—2
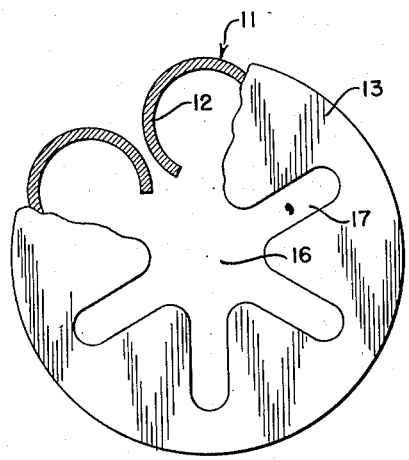
FIG.—3
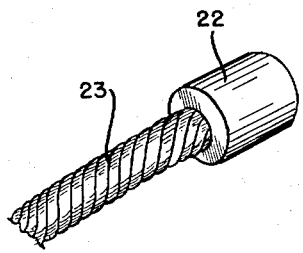
FIG.—6
INVENTOR.
Russell E. Hower &
BY   Al    Kuntz
ATTORNEY

Patented Feb. 23, 1954

2,669,761

UNITED STATES PATENT OFFICE 2,669,761

CABLE CONNECTOR

Russell E. Hower and Al Kuntz, Dubois, Wyo., assignors of one-third to J. N. Fisher, Dubois, Wyo.

Application December 29, 1950, Serial No. 203,409

1 Claim. (Cl. 24—123)

This invention relates to a fastening device useful in logging operations as a cable connector or winch-line skidding tool. In addition to its use in logging operations it is likewise useful wherever it is necessary to pull or drag a plurality of objects behind a single power unit.

Previously many different types of connectors have been designed and built so that objects that are to be moved behind a tractor may be conveniently and quickly secured to the tractor. The present device is considered to be an improvement over all prior devices inasmuch as a plurality of choker lines, cables, ropes, or the like may be attached to a single power-unit, draw-bar, winch cable or the like so that a plurality of objects may be towed behind the tractor or power-unit.

One of the major advantages of this latest design is that the fastening device itself may be trailed behind a tractor a considerable distance without danger of any of the choker lines coming free from the fastening device even though the fastening device itself comes into contact with the ground over which the objects are being moved. Since the choker lines used are firmly held in their respective sockets none of the choker lines will come loose during such use, notwithstanding slackening of the tension within such lines or the turning or rolling of the fastening device. In logging operations this fastening device has been found especially useful since an even greater number of logs may be secured to the single power-unit and moved by such unit to the mill or other point of use.

The features which enhance the utility of the present device are shown in the accompanying drawings in which:

Fig. 1 is a perspective view showing the general arrangement of the constituent elements of this device.

Fig. 2 is a top plan view of the assembled arrangement and

Fig. 3 is a bottom plan view further showing the structural features of the device.

Figs. 4 and 5 show the features of a novel type of logging operation possible when the present device is used, and Fig. 6 shows in perspective detail the features of a choke line having a swedged head that may be received in the socket of the fastening device.

Briefly stated the present invention provides a fastening device to which a plurality of cables may be secured. Structurally the device includes a number of circularly arranged socket members, each of which is adapted to receive and hold the swedged end of a cable, tow rope, line or other towing member. All of the sockets are supported by a single plate having a central opening therein and radially arranged slots disposed outwardly from said opening and communicating with the separate socket members. A plurality of bails or other force transmitting members are connected with the base supporting plate and a fastening ring, eye or catch is connected to the joined bails at the end away from the base plate.

In use, a cable, draw-bar pin or the like is passed through the eye of the assembled fastening device, the swedged heads of cables are passed through the central opening of the base plate and the cables are allowed to move into the radial slots as the swedged heads of the cables are moved downwardly into engagement with the separate socket members. When the heads of all of the cables being used are engaged in their respective sockets, towing forces imparted to the fastening device through the eye or fastening ring are transmitted by the bails to the base plate and by the base plate to each of the separately swedged heads of the cables. Since the cable heads are securely held in the separate socket members, all of the usual towing operations such as tightening, slacking off etc., may be indulged in without dislodging the cables from the fastening device.

Referring now to the drawings, the structural features of this device may be more clearly described in conjunction with Figs. 1, 2 and 3. In these figures it will be noted that the inventors provide a plurality of socket members 11 made up of cylindrical sections of pipe or tubing arranged so their respective longitudinal axes are parallel to and at an equal distance from a central axis. As shown the cylindrical pieces 12 making up the socket members are secured each to each other and respectively to a supporting base plate 13. The inwardly disposed faces of the cylindrical members 12 are relieved to provide openings 14 of width sufficient to pass the usual cable that is to be used with the particular fastening device. The base plate itself is punctured to provide an opening centrally thereof of dimension greater than the diameter of sockets 11. This opening 16 is interconnected with a plurality of radially disposed slots or grooves 17 communicating with the socket members 11. For ease in construction and strength it has been found that when the socket members are welded to each other by interconnecting welds 18 and are further welded to the base plate 13, a strong and sturdy unit is provided.

In order to connect the base plate and sockets to a towing mechanism a pair of bails 19 or other structural members are welded or otherwise secured to the base plate 13, and are joined together at a position above the socket members 11. At the central point of juncture of the bails 19 an eyelet or fastening ring 21 is either formed from one of the bails or welded to the crossed bails so that a cable, draw-bar pin or other towing force transmitting member may be interconnected with the fastening rings 21. As shown, these bails 19 and the fastening ring 21 are of sturdy construction so that a towing force of considerable magnitude may be transmitted to the base plate 13 and cables.

In using devices of the described type the choke lines that are to be used are provided with a cylindrically formed nob or head that may be inswedged to the cable, as shown in Fig. 6. When this arrangement is used the swedged head 22 is of considerably larger diameter than the diameter of the cable 23. Preferably the head of the cable 22 should be of a diameter corresponding to the inside diameter of the socket members 11 whereas the diameter of the cable 23 should correspond to the width of the slots 17 interconnecting the separate socket members with the central opening 16 in the base plate 13. When the swedged cable heads 22 are of the proper size there is little danger of their escape from the cylindrical socket members even under extreme conditions of use.

In ordinary operations, as many as six cables could be engaged with the fastening device shown and the same six cables could be joined at their other ends to six or more objects that were to be moved simultaneously by the same towing unit. For such operations the fastening ring may be connected directly to the draw bar pin of a towing unit or if desirable, it may be connected to a winch line cable.

A specially advantageous use of the present device is possible in logging and similar operations where the tractor or motive power unit being used has sufficient force to move a considerable number of logs over smooth terrain or main roads whereas it does not have sufficient force to move the same number of logs over rough terrain or uphill. For operations of this type the present inventors' device is especially useful since the fastening device 10 may be engaged to the end of a winch line. Since a winch is usually provided on the back of most tractors and since the line can be reeved out by manipulation of the control levers, it is possible to connect a plurality of logs and other towed objects close to the tractor 25 by connecting the choker lines of such logs to a fastening device that is itself connected to the draw bar of the tractor. Additional logs are connected with the fastening device 10 on the end of the winch line 24. When the tractor is moving over smooth terrain it will be possible for the tractor to move both the close connected logs 26 and the logs 27 that are connected to the winch line 24 simultaneously. Whenever conditions are reached such that the towing force exerted by the tractor is less than the force necessary to move the close connected logs 26 and the winch line connected logs 27, the tractor operator may move the tractor forward by reeving out the winch line 24 thus leaving the winch line connected logs 27 in a position of rest. When the rough terrain has been traversed by the tractor the operator can then reeve in the winch line 24 to bring the logs 27 to a position closely adjacent to the close connected logs 25. As illustrated in Figs. 4 and 5 this type of operation is especially advantageous where logs or other objects must be moved up an incline to the sawmill or other point of use. In Fig. 4 it will be noted that the logs 26 and 27 are in relatively close positions for movement along the smooth terrain whereas in Fig. 5 it is shown that the winch line 24 has been reeved out to leave the logs 27 at the base of the hill or incline 28 while the tractor 25 and the close connected logs 26 have been moved up the hill 28. From the elevated position shown in Fig. 5 the winch line 24 may be reeved in to move the logs 27 up the incline 28.

Since the fastening device 10 may be connected to a towing unit at the draw bar or to the outer end of a winch line, the utility of the present inventors' device is relatively obvious. An important feature of this invention is the circular arrangement of the socket members 11 so that the cable ends 22 rest in the sockets and do not have a tendency to escape from the fastening device 10 even though such device is dragged and rolled along the ground.

Whereas one specific type of fastening device has been shown and described, it is apparent that the features of the present inventors' device may be adapted to other types of structures. All such modifications and changes of the present device as are suggested by the details of such device are deemed to be a part of this invention and accordingly the inventors intend to be limited only within the scope of the hereunto appended claim.

We claim:

In a fastening device for connecting a plurality of towing cables to a single power unit, each of said towing cables being provided with an enlarged head portion, a disc-like base portion provided with a centrally located aperture of substantially greater diameter than the enlarged head portion of a towing cable, said base portion being further provided with a plurality of radially disposed slots extending outwardly from said centrally located aperture and communicating therewith, the width of each of said slots being such that a towing cable may extend therethrough, a plurality of socket-forming members fixedly secured to one face of said base portion, the number of socket-forming members corresponding to the number of radially disposed slots and said socket-forming members being so located that a socket-forming member surrounds the outer extremity of each radially disposed slot, each socket-forming member comprising an arcuate wall portion having a longitudinally disposed opening therein located in alignment with the associated radial slot and of slightly greater width than the width of said slot, said wall portion opening being of a width less than the diameter of the socket-forming member, the interior configuration of each socket-forming member being complementary to that of the enlarged head portion of a towing cable whereby said head portion may be snugly received within a socket-forming member with the towing cable extending through the associated radial slot, and a pair of diametrically opposed U-shaped bail members fixedly connected to said base portion and extending outwardly therefrom on the same side thereof as said socket-forming members, the legs of said bail members being fixedly secured to the adjacent socket-forming members to provide a unitary structure, the base portions of said bail members overlapping centrally and having an eye portion for connection to a power unit whereby towing forces may be transmitted to said fastening device and towing cables.

RUSSELL E. HOWER.
    AL KUNTZ.

References Cited in the file of this patent

UNITED STATES PATENTS

| Number | Name | Date |
|---|---|---|
| 652,617 | Hotz | June 26, 1900 |
| 1,265,778 | Hartline | May 14, 1918 |
| 1,656,676 | Mills | Jan. 17, 1928 |
| 1,699,381 | Stewart | Jan. 15, 1929 |
| 1,724,835 | Goodridge | Aug. 13, 1929 |
| 1,892,888 | Hawley | Jan. 3, 1933 |
| 1,897,920 | Wilson | Feb. 14, 1933 |
| 2,406,607 | Jensen | Aug. 27, 1946 |
| 2,551,803 | Leonard | May 8, 1951 |